(12) United States Patent
Bucciferro et al.

(10) Patent No.: US 7,597,516 B2
(45) Date of Patent: Oct. 6, 2009

(54) BONDING FASTENER

(75) Inventors: Robert G. Bucciferro, Joliet, IL (US); Joseph A. Chopp, Jr., New Lenox, IL (US); Larry S. Mohr, Peotone, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/383,525

(22) Filed: May 16, 2006

(65) Prior Publication Data
US 2006/0257229 A1 Nov. 16, 2006

Related U.S. Application Data

(60) Provisional application No. 60/681,380, filed on May 16, 2005.

(51) Int. Cl.
*F16B 39/282* (2006.01)
*F16B 39/24* (2006.01)

(52) U.S. Cl. ...................... 411/187; 411/162

(58) Field of Classification Search ............... 411/184, 411/187, 188, 160–162
See application file for complete search history.

(56) References Cited

U.S. PATENT DOCUMENTS

| | | | | |
|---|---|---|---|---|
| 752,628 A | * | 2/1904 | Miner | 411/188 |
| 1,183,174 A | * | 5/1916 | Dice | 411/162 |
| 1,855,447 A | | 4/1932 | Hagstedt | |
| 1,923,647 A | * | 8/1933 | Vera | 411/188 |
| 1,952,305 A | * | 3/1934 | Beck | 411/188 |
| 2,763,312 A | * | 9/1956 | Redmer | 411/134 |
| 2,959,204 A | * | 11/1960 | Rigot | 411/186 |
| 3,180,126 A | * | 4/1965 | Carlson | 72/365.2 |
| 3,255,797 A | | 6/1966 | Attwood | |
| 3,389,734 A | | 6/1968 | Gutshall | |
| 3,535,678 A | | 10/1970 | Gulistan | |
| 3,640,326 A | | 2/1972 | Brown | |
| 4,034,788 A | | 7/1977 | Melone | |
| 4,220,188 A | | 9/1980 | McMurray | |
| 4,304,503 A | | 12/1981 | Gehring et al. | |
| 4,705,441 A | | 11/1987 | Arnold | |
| 4,764,066 A | | 8/1988 | Terrell et al. | |
| 4,808,050 A | * | 2/1989 | Landt | 411/188 |
| 4,812,095 A | | 3/1989 | Piacenti et al. | |
| 4,820,235 A | | 4/1989 | Weber et al. | |
| 5,024,251 A | | 6/1991 | Chapman | |
| 5,039,262 A | | 8/1991 | Giannuzzi | |
| 5,183,359 A | * | 2/1993 | Barth | 411/188 |
| 5,199,839 A | | 4/1993 | DeHaitre | |
| 5,207,588 A | | 5/1993 | Ladouceur et al. | |
| 5,356,253 A | | 10/1994 | Whitesell | |
| 5,441,417 A | | 8/1995 | Ladouceur et al. | |

(Continued)

FOREIGN PATENT DOCUMENTS

WO WO 9300517 A1 1/1993

*Primary Examiner*—Flemming Saether
(74) *Attorney, Agent, or Firm*—Robert A. McCann; Christopher S. Clancy

(57) ABSTRACT

Fastener device secures two separate structures together and may ground electrical current running through the structures. In one embodiment, fastener includes a plurality of projections for removing paint from an external surface of one structure. Depending on relative hardness measurements, the plurality of projections may also penetrate the structure. In another embodiment, fastener may be utilized to secure and ground rack/patch panel systems that house electrical equipment.

19 Claims, 5 Drawing Sheets

U.S. PATENT DOCUMENTS

| | | |
|---|---|---|
| 5,487,685 A | 1/1996 | Stillback et al. |
| 5,928,006 A | 7/1999 | Franks, Jr. |
| 6,135,689 A * | 10/2000 | Matsunami ................. 411/311 |
| 6,206,737 B1 | 3/2001 | Bonilla et al. |
| 6,224,340 B1 * | 5/2001 | Lessig, III .............. 416/244 R |
| 6,241,444 B1 | 6/2001 | Clarke |
| 6,334,748 B1 | 1/2002 | Gudjonsson |
| 6,343,904 B1 | 2/2002 | Wang |
| 6,406,238 B2 * | 6/2002 | Takeuchi et al. ............ 411/188 |
| 6,471,457 B2 | 10/2002 | Nago |
| 6,908,270 B1 * | 6/2005 | Iwata ......................... 411/188 |
| 6,981,829 B2 * | 1/2006 | Wilson .......................... 411/1 |

* cited by examiner

BONDING FASTENER

CROSS-REFERENCE TO RELATED APPLICATION

This application claims priority to U.S. Provisional Application No. 60/681,380, filed May 16, 2005, the entirety of which is incorporated herein by reference.

FIELD OF INVENTION

This invention relates to fasteners for securing two structures and, more particularly, to fasteners used to secure patch panels to racks for holding electrical equipment.

BACKGROUND

Various types of fastener arrangements for securing two structures together are known in the art. Depending on the structures being connected, existing fasteners do not necessarily create a sufficient electrical bond between the structures to establish a grounded condition.

In the area of network equipment enclosure racks, for example, standard screw-type fasteners may be employed for mounting patch panels to racks. Such rack/patch panel systems manage and organize cables extending to and from electrical equipment and/or to and from other patch panels.

To ensure that these types of systems are grounded, separate grounding wires are traditionally used. The grounding wires are attached at one end to a stud or post welded to the patch panel and to a grounding bus bar mounted to the rack at the other end. The ground wires can be attached separately to the grounding bus bar or attached daisy chain style, in which case only the last patch panel is connected to the grounding bus bar. In either case, the process is labor intensive and use of the stud or post requires a secondary manufacturing step.

There is a need for a fastener that can effectively ground rack/patch panel systems.

SUMMARY OF THE INVENTION

The bonding fastener of the present invention is adapted to secure two separate structures together. Typically, the structures are constructed of metal and painted, such as rack and patch panel structures. In one aspect, the bonding fastener may assist in the removal of paint from an external surface of one structure. In another aspect, the bonding fastener may advantageously establish an electrical connection between the two structures. In this way, the bonding fastener may help avoid electrical discharge and shock.

In one embodiment, the fastener device of the present invention comprises a head comprising a bottom surface, a shaft extending from the bottom surface of the head and at least one projection extending from the bottom surface of the head. The at least one projection may comprise two or more surfaces that form an apex. The at least one projection may further comprise a body with a length and a width, wherein the length exceeds the width and intersects at least one radial axis of the shaft positioned substantially perpendicular thereto.

In another embodiment, the fastener device of the present invention comprises a head comprising a bottom surface, a shaft extending from the bottom surface of the head, and at least two adjacent spaced apart projections extending from the bottom surface of the head. The at least two projections may comprise two or more surfaces extending from the bottom surface of the head, wherein the two or more surfaces form an apex and one of the surfaces forms an angle of inclination relative to the bottom surface of the head smaller than another angle of inclination formed by the other of the surfaces relative to the bottom surface of the head.

In still another embodiment, the fastener device of the present invention comprises a head comprising a bottom surface, a shaft extending from the bottom surface of the head and at least two adjacent spaced apart projections extending from the bottom surface of the head. The at least two projections may comprise a first projection comprising two or more surfaces extending from the bottom surface and forming an apex and a second projection comprising a flat surface spaced apart from the bottom surface.

In addition, the foregoing embodiments may incorporate various other features. The top surface of the head may define a groove and the shaft may comprise threads. The shaft may also comprise a trilobular cross-section and a distal end absent of threads. The at least one projection may comprise at least two adjacent spaced apart projections and typically comprises between eight and twelve spaced apart projections. The projections may be positioned around the shaft and spaced apart from the shaft. In some cases, the projections are positioned closer to an outer edge of the head than to the shaft. In other cases, the projections are positioned approximately midway between the shaft and an outer edge of the head. The configuration and placement of the projections may also vary. For example, the body of the projections may comprise a substantially rectangular shape adjacent the bottom surface. In an alternate embodiment, the projections are positioned on a removable washer as opposed to the bottom surface of the head.

DETAILED DESCRIPTION

Figure 1:
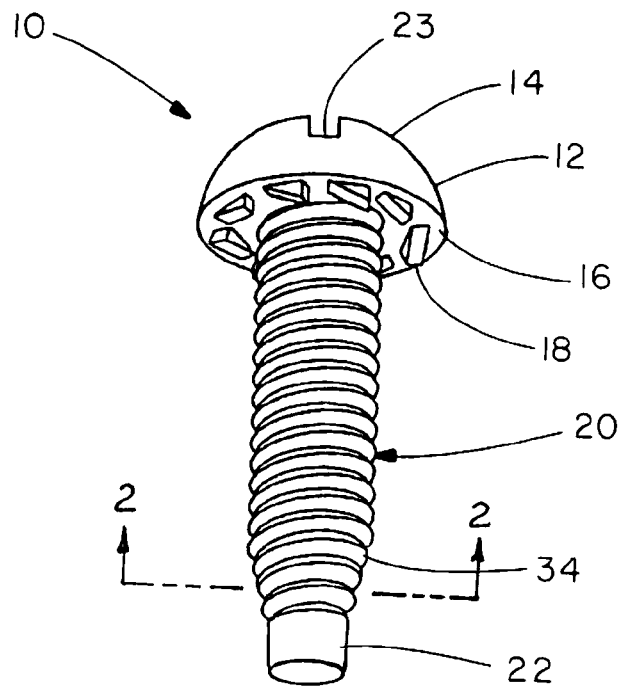
FIG. 1 is a perspective bottom view of one embodiment of the bonding fastener of the present invention.

Referring now to FIG. 1, one embodiment of the bonding fastener 10 of the present invention is shown. Fastener 10 includes head 12, comprising top surface 14 and bottom surface 16, projections 18, shaft 20 and tip 22.

Top surface 14 of head 12 includes at least one groove 23. The configuration of groove 23 may vary to accommodate a wide variety of installation tools. For example, groove 23 may comprise a single slot for use with a flat screwdriver or cross-shaped slots for use with a phillips screwdriver, just to name a few. Other configurations known to those of skill in the art, however, may be employed.

Figures 2A, 2B:
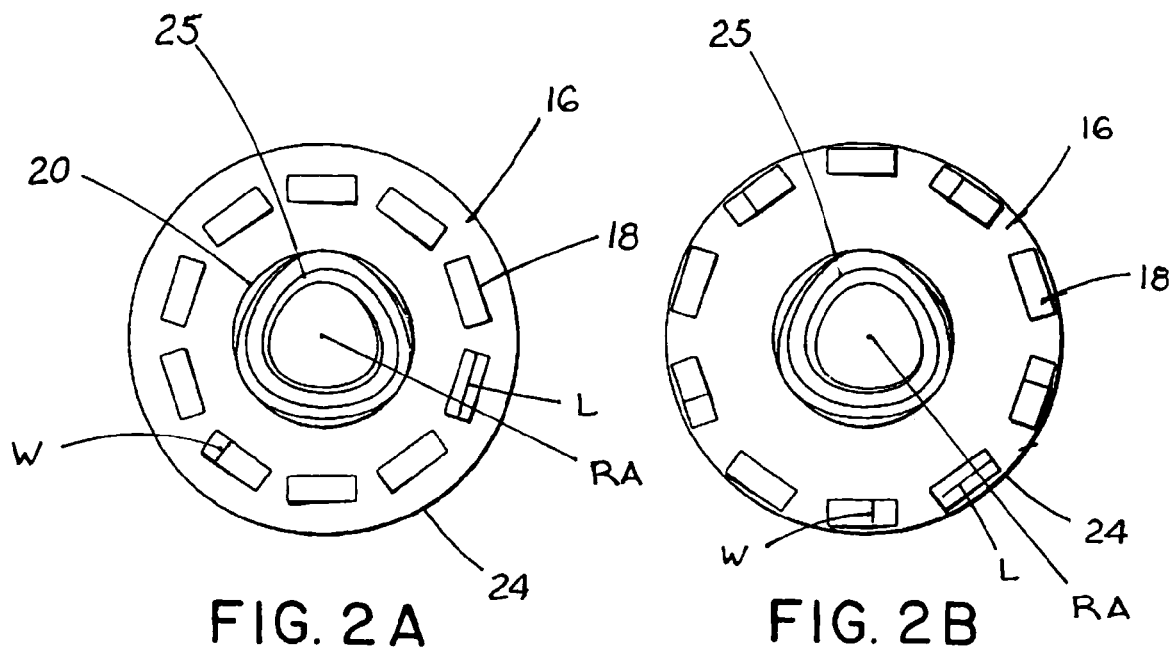
FIG. 2A is a cross-sectional view taken along lines 2-2 of FIG. 1.
FIG. 2B is a cross-sectional view of an alternate embodiment of the bonding fastener of FIG. 1.

The positioning and number of projections 18 on bottom surface 16 may also vary. Referring to FIGS. 2A and 2B, alternate positioning is shown. As shown in FIG. 2A, projections 18 are positioned approximately midway between shaft 20 and outer edge 24 of bottom surface 16. In FIG. 2B, projections 18 are positioned along outer edge 24 of bottom surface 16, spaced apart from and closer to outer edge 24 than shaft 20. Positioning projections 18 in this location, proximate to outer edge 24, provides relatively increased travel distance and bonding surface area when installing fastener 10 to secure two structures together. Under either construction, between about one and about fifteen projections 18 may be employed, with between eight and twelve projections 18 being typical.

Figure 3A:
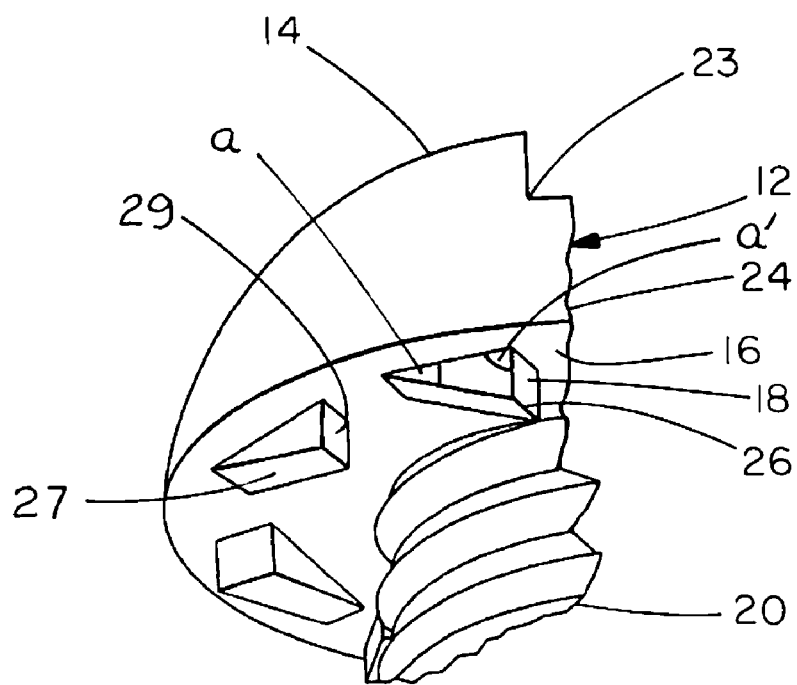
FIG. 3A is a partially broken away blown-up view of a portion of the bonding fastener of FIG. 1.

Similarly, the configuration of projections 18 is variable. As shown in FIG. 2A, projections 18 may comprise length L and width W, where L exceeds W. Projections 18 may further comprise first surface 27 and second surface 29, which form apex or pointed edge 26, as best seen in FIG. 3A. Additionally, first surface 27 forms an angle of inclination a relative to bottom surface 16 of head 12 smaller than another angle of inclination a' formed by second surface 29 relative to bottom surface 16 of head 12. First surface 27 is typically longer than second surface 29. Pointed edge 26 is useful for removing paint from an external surface of a structure on which fastener 10 is installed and, depending on its hardness, penetrating that surface during installation. Further, pointed edge 26, because of its penetrating effect, may help to prevent loosening after installation. If hardness of fastener 10 is less than that of the structure with which it is employed, projections 18 may be ground down to flat surfaces for increased surface area.

Figure 3B:
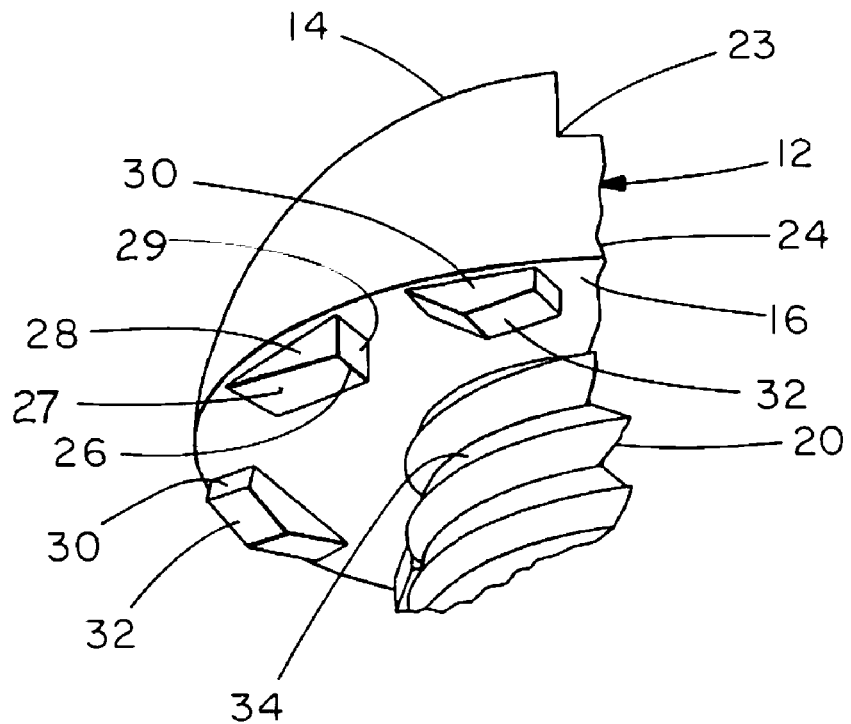
FIG. 3B is a partially broken away blown-up view of a portion of the alternate embodiment of the bonding fastener of the present invention.

As discussed hereinafter, heating fastener 10 to certain predetermined temperatures can lead to increased hardness. As shown in FIG. 3B, two different types of projections 18 are disposed on bottom surface 16 of head 12. Leading projection 28 exhibits the configuration shown in FIG. 3A. Trailing projection 30, on the other hand, comprises flat surface 32, designed to increase the surface area for connection to a structure on which fastener 10 is installed. Both leading and trailing projections 28 and 30 may comprise a substantially rectangular shape adjacent bottom surface 16 of head 12. The surface area of flat surface 32 may be between about 0.0002 in$^2$ and about 0.005 in$^2$.

Figure 4A:
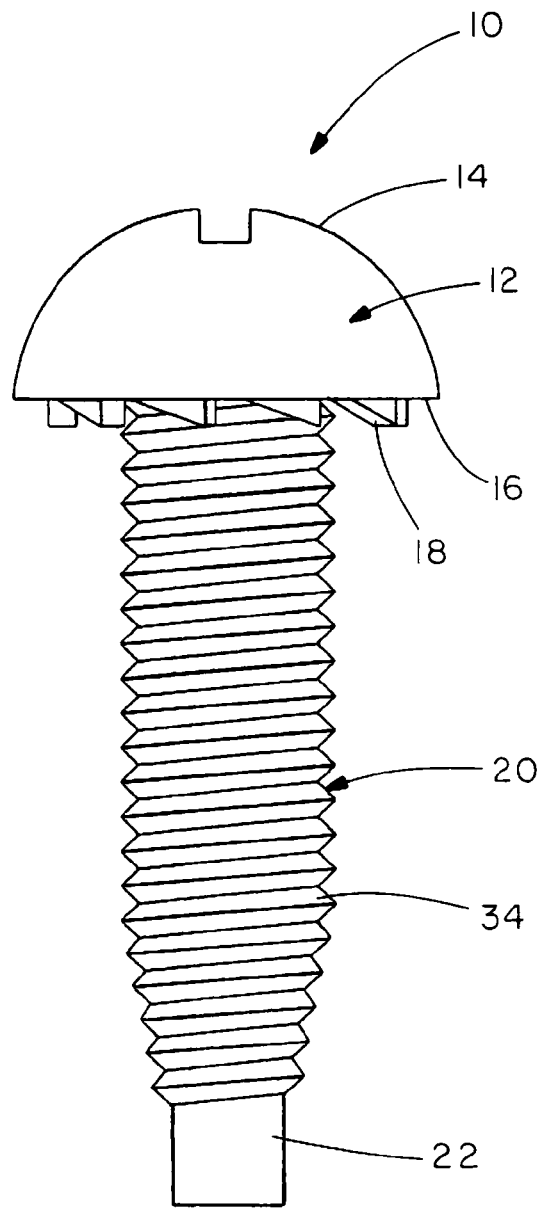
FIG. 4A is a side elevational view of the bonding fastener of FIG. 1.
Figure 4B:
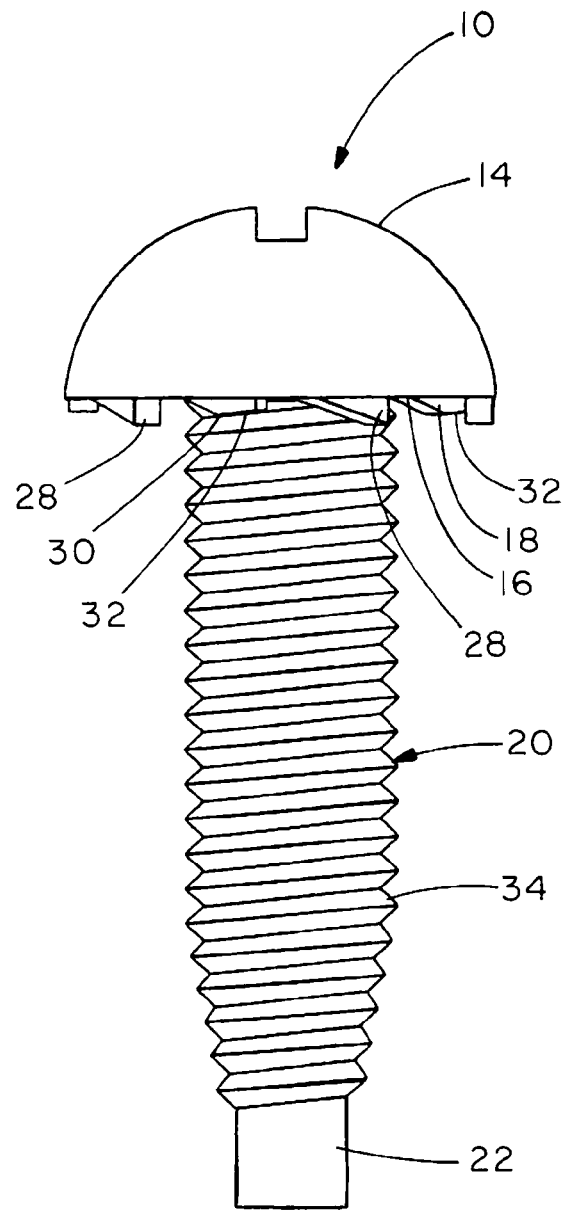
FIG. 4B is a side elevational view of the alternate embodiment of the bonding fastener shown in FIG. 3B.

Because of their configurations, as shown in FIG. 4B, leading and trailing projections 28 and 30 are disposed at different elevations relative to bottom surface 16 of head 12. The elevation of leading projection 28 is typically greater than that of trailing projection 30. The elevation of leading projection 28 may be between about 0.010 inches and about 0.040 inches, while the elevation of trailing projection 30 may be between about 0.005 inches and about 0.035 inches. The difference in elevation, therefore, may be between about 0.005 inches and 0.035 inches. Typically, the difference in elevation is about 0.005 inches. Under this construction, leading projection 28 can remove paint and penetrate an external surface of a structure on which fastener 10 is installed, while trailing projection 30 remains free of paint prior to making contact with the external surface to which fastener 10 is secured.

Shaft 20 comprises threaded portion 34 and radial axis RA (see FIGS. 2A and 2B). In one embodiment, shown in FIG. 3B, flat surface 32 of at least some of trailing projections 30 is angled in the same plane as threads of threaded portion 34. This arrangement facilitates installation and helps ensure that flat surface 32 contacts the structure on which fastener 10 is installed to the maximum extent possible. In another embodiment, shown in FIGS. 2A and 2B, length L of at least one of the projections 28 or 30 intersects radial axis RA positioned substantially perpendicular thereto.

Tip 22 is adapted to align fastener 10 with openings in the structures being connected. In certain embodiments, the bottom portion of shaft 20 has a trilobular cross-section 25 (i.e., having three lobes), as shown in FIGS. 1, 2A and 2B. The trilobular configuration can extend into two to four threads positioned immediately above tip 22 and assists in clearing paint out of a threaded portion on a structure on which it is being installed, while helping to limit the creation of metal shavings during the process.

Figure 5A:
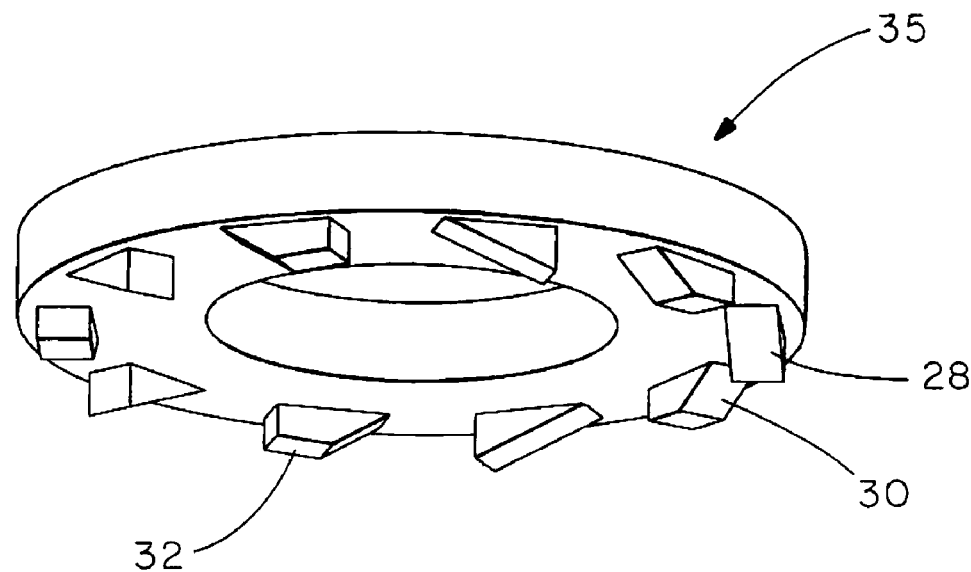
FIG. 5A is a perspective view of a washer used in connection with another alternate embodiment of the bonding fastener of the present invention.
Figure 5B:
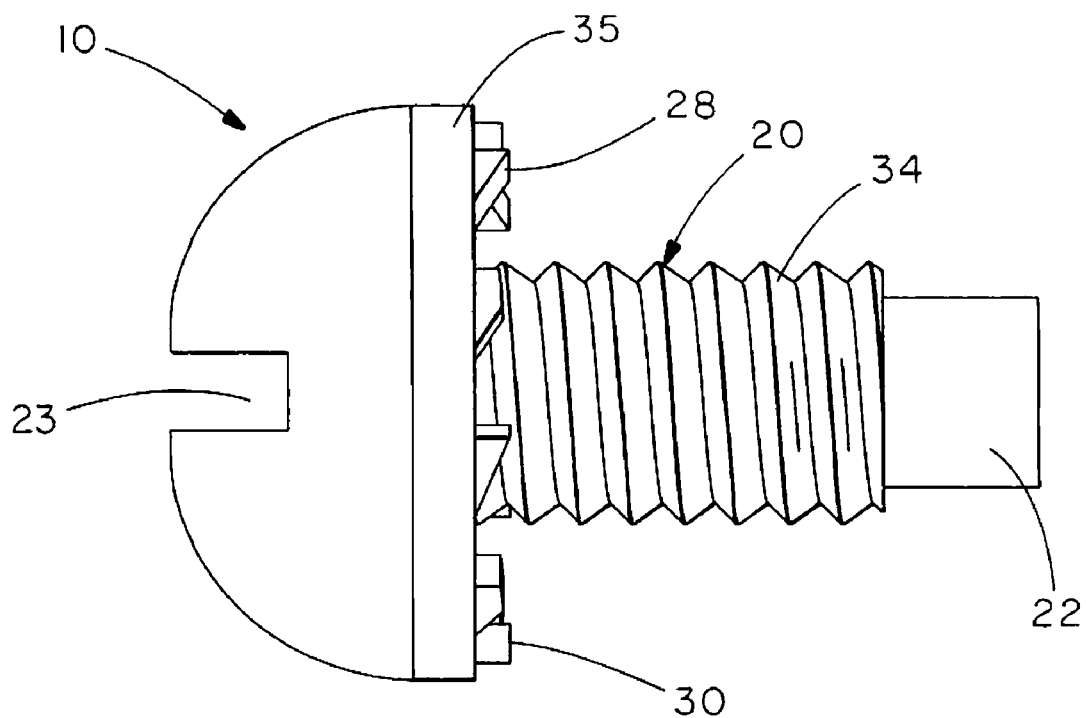
FIG. 5B is a side elevational view of the alternate embodiment of the fastener of the present invention with the washer of FIG. 5A in position.
Figure 6:
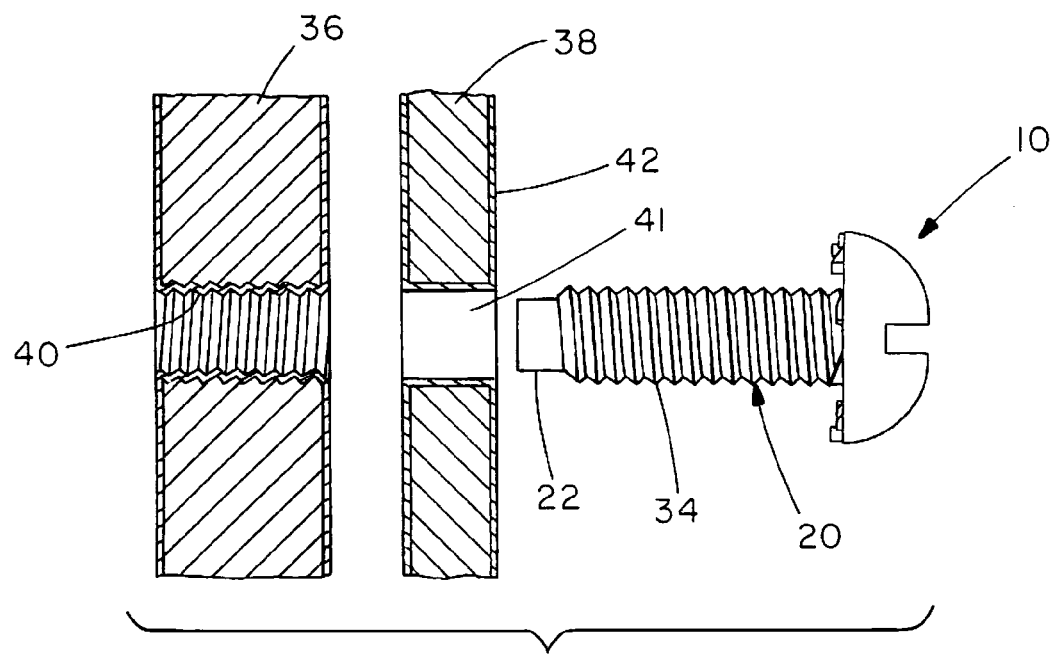
FIG. 6 is an exploded unassembled view of the bonding fastener of the present invention and first and second structures, in cross-section.

In an alternate embodiment, shown in FIGS. 5 and 6, removable washer 35, as opposed to bottom surface 16 of head 12, includes leading and trailing projections 28 and 30. As shown in FIG. 6, washer 35 may be positioned about threaded portion 34 of fastener in contact with bottom surface 16 of head 12, which is adapted to receive washer 35. Bonding fastener 10 may be stamped out of an electrically conductive material, such as steel. A stamping press or similar device may be employed. Washer 35 may be machined out of low carbon steel. After bonding fastener 10 and/or washer are fabricated, heating in a furnace with charcoal powder may optionally follow. Heating at a temperature between about 1.500° F. and about 1.900° F., followed by quenching, increases the hardness of fastener 10.

Hardness of fastener 10 can be determined with a Rockwell scale, which measures the indentation hardness of materials through the depth of penetration of an indenter. Fasteners of the present invention may exhibit hardness measurements between about 25.0 HR and about 80.0 HR, typically between about 45.0 HR and about 60.0 HR.

Figures 7A, 7B:
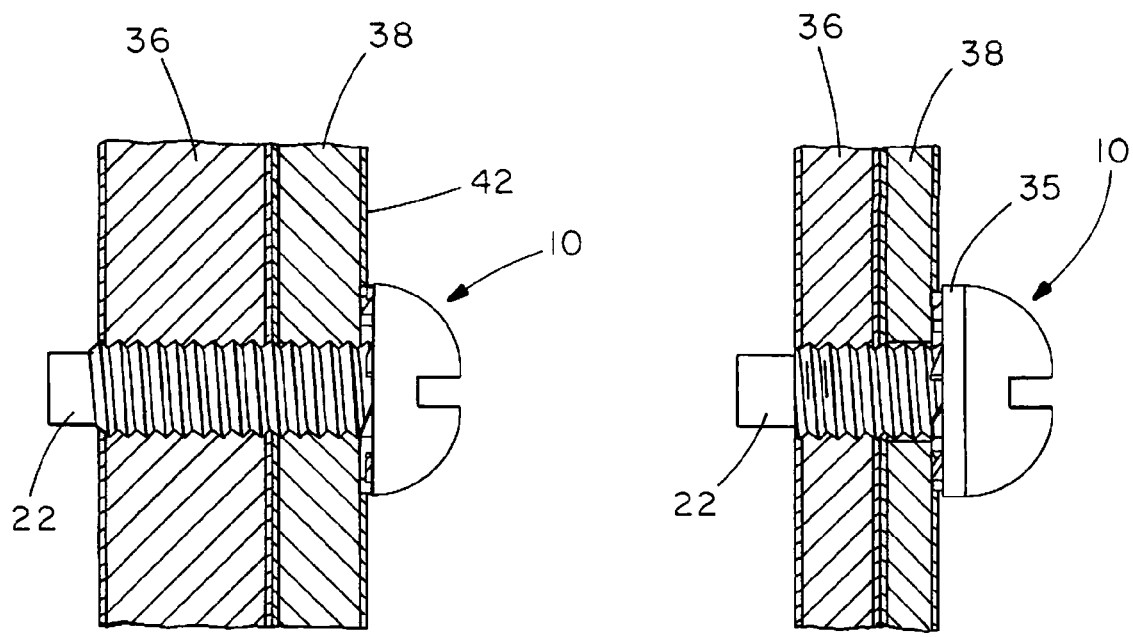
FIG. 7A is a cross-sectional assembled view of FIG. 6.
FIG. 7B is a cross-sectional assembled view of FIG. 6 using the alternate embodiment of the fastener of FIG. 5B.

As shown in FIG. 6, bonding fastener 10 may be used to secure first and second structures 36 and 38 together. Although FIG. 6 depicts fastener 10 without washer 35, the alternate embodiment of FIG. 5B can be substituted for the embodiment of fastener 10 shown in FIG. 6. One of first and second structures 36 and 38 comprises threaded apertures 40 adapted to receive threaded portion 34 of shaft 20. Second structure 38 also comprises second aperture 41, alignable with threaded aperture 40. After apertures 40 and 41 of first and second structures 36 and 38 are aligned, fastener 10 is installed, as shown in FIGS. 7A and 7B.

As mentioned hereinabove, in one embodiment, first structure 36 is a rack and second structure 38 is a patch panel. Exemplary rack/patch panel systems carry electrical equipment and are shown in co-owned U.S. Pat. No. 6,866,541. Standard racks include a plurality of threaded mounting apertures, disposed along opposing vertical members. Patch panels also include apertures, alignable with the mounting apertures of the racks. Racks and patch panels are often painted, and paint can drip into the respective apertures during fabrication.

To secure rack 36 and patch panel 38 with fastener 10, the mounting apertures of rack 36 are aligned with the mounting apertures of patch panel 38, followed by installation of fastener 10 by methods known to those of skill in the art. As fastener 10 is installed, threaded portion 34 clears paint from the threaded mounting apertures 40 of rack 36 and projections 18 clear paint from an external surface 42 of patch panel 38. Based on fastener hardness, projections 18 may also penetrate an external surface 42 of patch panel 38. Dry paint and patch panel 38 typically exhibit hardness measurements of 10.0 HR or less and 20.0 HR, respectively. When leading and trailing projections 28 and 30 are employed, leading projections 28 help clear the way for trailing projections 30 to contact the substantially paint-free external surface of patch panel 38.

In this way, a connection between the substantially paint-free surfaces of rack 36, fastener 10 and patch panel 38 is established. That is, electrical bonds between (1) the mounting apertures of rack 36 and threaded portion 34 of fastener 10 as well as (2) external surface 42 of patch panel 38 and projections 18 of fastener 10 are formed. As used herein, the term electrical bond means any electrical connection between two structures. These electrical bonds serve to ground electrical current running through the rack/patch panel system, thereby reducing the need for existing grounding devices known in the art. Through use of the fastener of the present invention, the connection between the rack and patch panel has an electrical capacity of up to about 75 Amp, typically about 65 Amp.

Variations, modifications and other implementations of what is described herein will occur to those of ordinary skill in the art without departing from the spirit and scope of the invention. Accordingly, the invention is in no way limited by the preceding illustrative description.

The invention claimed is:

1. A fastener device securable to electrical equipment comprising an external surface, said fastener device comprising:
   a head comprising a bottom surface;
   a shaft extending from the bottom surface of the head;
   at least two projections extending from the bottom surface of the head, the at least two projections comprising:
      a leading projection comprising a first generally planar surface extending from the bottom surface of the head to an edge and a second generally planar surface extending from the edge back to the bottom surface of the head to form an apex;
      a trailing projection comprising a first generally planar surface extending from the bottom surface of the head to a first edge, a second generally planar surface extending from the first edge to a second edge to form a flat surface and a third generally planar surface extending from the second edge back to the bottom surface of the head; and
   wherein the apex of the leading projection and the flat surface of the trailing projection are positioned at different elevations relative to the bottom surface of the head, with both of said apex of the leading projection and said flat surface of the trailing projection positioned to contact the external surface of the electrical equipment after securement of the fastener device to the electrical equipment.

2. The fastener device of claim 1, wherein said external surface of said electrical equipment comprises paint and wherein the apex of the leading projection is positioned to remove at least a portion of the paint of the external surface prior to contact by the flat surface of the trailing projection and thereby provide a substantially paint free area of the external surface and the flat surface of the trailing projection is positioned to contact the substantially paint free external surface upon securement of the fastener device to the electrical equipment.

3. The fastener device of claim 1, wherein the at least two projection are positioned in spaced apart relation.

4. The fastener device of claim 1, wherein the at least two projections comprise a body with a length and a width, wherein the length exceeds the width and the length intersects a radial axis of the shaft positioned substantially perpendicular thereto.

5. The fastener device of claim 1, wherein the at least two projections are positioned closer to an outer edge of the head than to the shaft.

6. The fastener device of claim 1, wherein the fastener includes a hardness between 45.0 HR and 60.0 HR.

7. The fastener device of claim 1, wherein a portion of the shaft comprises a trilobular cross-section.

8. The fastener device of claim 1, wherein the elevation of the leading projection is between about 0.010 inches and about 0.040 inches and the elevation of the trailing projection is between about 0.005 and 0.035 inches.

9. The fastener device of claim 1, wherein the leading projection and the trailing projection are positioned approximately midway between the shaft and an outer edge of the head.

10. The fastener device of claim 1, wherein the shaft comprises a threaded portion and the flat surface of the trailing projection is angled in the same plane as the threads of the threaded portion.

11. A fastener device securable to electrical equipment comprising an external surface, said fastener device comprising:
   a head comprising a bottom surface;
   a shaft extending from the bottom surface of the head;
   a removable washer positioned about the shaft and contacting the bottom surface of the head, said removable washer comprising a bottom surface with at least two projections extending therefrom, the at least two projections comprising:
      a leading projection comprising a first generally planar surface extending from the bottom surface of the head to an edge and a second generally planar surface extending from the edge back to the bottom surface of the head to form an apex;
      a trailing projection comprising a first generally planar surface extending from the bottom surface of the head to a first edge, a second generally planar surface extending from the first edge to a second edge to form a flat surface and a third generally planar surface extending from the second edge back to the bottom surface of the head; and
   wherein the apex of the leading projection and the flat surface are positioned at different elevations relative to the bottom surface of the head, with both of said leading and trailing projections positioned to contact the external surface of the electrical equipment after securement of the fastener device to the electrical equipment.

12. The fastener device of claim 11, wherein said external surface of said electrical equipment comprises paint and wherein the apex of the leading projection is positioned to remove the paint of the external surface prior to contact by the flat surface of the trailing projection and thereby provide a substantially paint free external surface and the flat surface of the trailing projection is positioned to contact the substantially paint free external surface upon securement of the fastener device to the electrical equipment.

13. The fastener device of claim 11, wherein the at least two projections are positioned in spaced apart relation.

14. The fastener device of claim 11, wherein the at least two projections comprise a body with a length and a width, wherein the length exceeds the width and the length intersects a radial axis of the shaft positioned substantially perpendicular thereto.

15. The fastener device of claim 11, wherein the at least two projections are positioned closer to an outer edge of the head than to the shaft.

16. The fastener device of claim 11, wherein the fastener includes a hardness between 45.0 HR and 60.0 HR.

17. The fastener device of claim 11, wherein a portion of the shaft comprises a trilobular cross-section.

18. The fastener device of claim 11, wherein the leading projection and the trailing projection are positioned approximately midway between the shaft and an outer edge of the head.

19. The fastener device of claim 11, wherein the shaft comprises a threaded portion and the flat surface of the trailing projection is angled in the same plane as the threads of the threaded portion.

* * * * *